G. O. DEGENER & H. RESCH.
COMBINED TYPE WRITING AND COMPUTING MACHINE.
APPLICATION FILED AUG. 27, 1910.

1,077,684.

Patented Nov. 4, 1913.

UNITED STATES PATENT OFFICE.

GUSTAVE O. DEGENER, OF NEW YORK, N. Y., AND HENRY RESCH, OF BAYONNE, NEW JERSEY, ASSIGNORS TO UNDERWOOD COMPUTING MACHINE COMPANY, OF NEW YORK, N. Y., A CORPORATION OF NEW YORK.

COMBINED TYPE-WRITING AND COMPUTING MACHINE.

1,077,684.     Specification of Letters Patent.    Patented Nov. 4, 1913.

Application filed August 27, 1910. Serial No. 579,226.

*To all whom it may concern:*

Be it known that we, GUSTAVE O. DEGENER, residing in New York city, county of New York, and State of New York, and HENRY RESCH, residing in Bayonne, county of Hudson, and State of New Jersey, both citizens of the United States, have invented certain new and useful Improvements in Combined Type-Writing and Computing Machines, of which the following is a specification.

This invention relates to typewriting and computing machines, particularly those in which a power-driven computing mechanism is employed, and in which the numeral keys of the typewriter set up escapement-pins or other devices which determine the extent of rotation of the computing mechanism.

To guard against mistakes of computation, each numeral key has been caused to lock the remaining type-operating keys against actuation, until the completion of the computing operation that was begun by the actuation of the preceding numeral key. Each numeral key has been caused to move a locking mechanism into position to intercept any of the type-operating keys, and these locking devices have been mechanically latched in effective positions, to be released by the computing mechanism at the completion of the movement of the latter. Each numeral key has also been caused to lock the computing mechanism itself against actuation, until the movement of the feeding devices which control the paper-carriage of the typewriter.

It is likely to happen in some cases, that a numeral key may be depressed far enough to set up the escapement-pin of the feeding mechanism, and also to set the key-locking and other devices, without, however, being moved far enough to cause operation of the carriage-feeding devices; so that upon the return of such numeral key to normal position, the keys of the typewriter remain locked. To overcome this objection, we provide an auxiliary or emergency key, the depression of which will unlock all of the remaining keys of the typewriter; this result being effected preferably by simply operating the carriage-feeding devices, so that the power-driven computing mechanism will become unlocked and permitted to operate, thereby in turn releasing the typewriter keys.

Another feature of this invention consists in pivoting the locking hooks to the numeral key-levers instead of forming them integrally therewith, as heretofore. This enables any numeral key, after causing the locking bar to move to effective position, to return itself to normal position independently of said bar, and also to become locked thereby.

Other features and advantages will hereinafter appear.

In the accompanying drawings, Fig. 2 is a perspective view of the emergency key for releasing the typewriting keys, showing also the device which prevents the operation of said emergency key simultaneously with the numeral or other keys. Fig. 3 is a part-sectional rear elevation of the typewriting and computing devices, showing the parts in normal positions. Fig. 3ª shows an alphabet key-lever with the locking-hook formed or fixed thereon.

Figure 1:
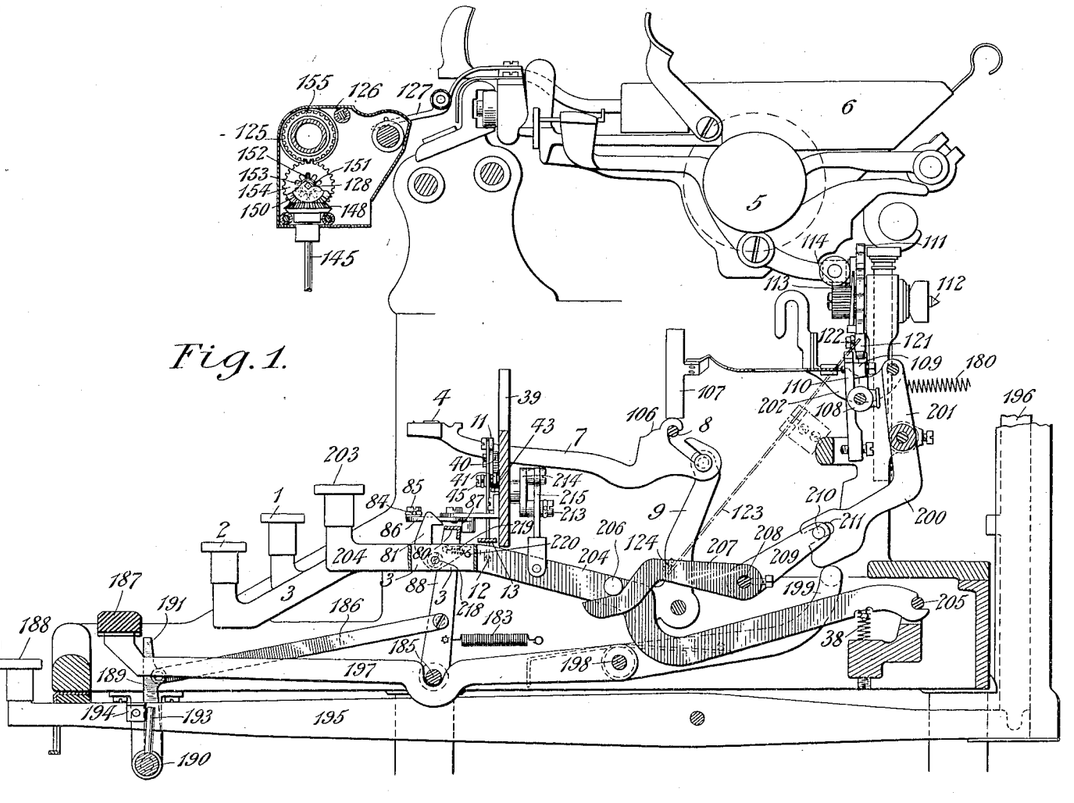
Figure 1 is a sectional side elevation of an Underwood front-strike writing and computing machine provided with the present improvements; the parts being shown in normal positions.

Key levers 3, Fig. 1, carrying alphabet keys 2 and figure keys 1, operate the letter and figure types 4, causing them to strike rearwardly against the platen 5 journaled in the platen frame 6, the type being carried upon bars 7 fulcrumed at 8 and swung by bell cranks 9, which are connected to the key levers 3, as usual in the Underwood typewriter. Hooks 10, pendent from bell cranks 11, Figs. 1 and 3, catch loosely in perforations 12 formed in the key levers 3, which operate the numeral types. These hooks pass loosely through a disconnecting bar 13, which may be pulled to the left at Fig. 3 to disconnect the keys from the computing mechanism whenever desired.

Figures 2, 3, 3A:
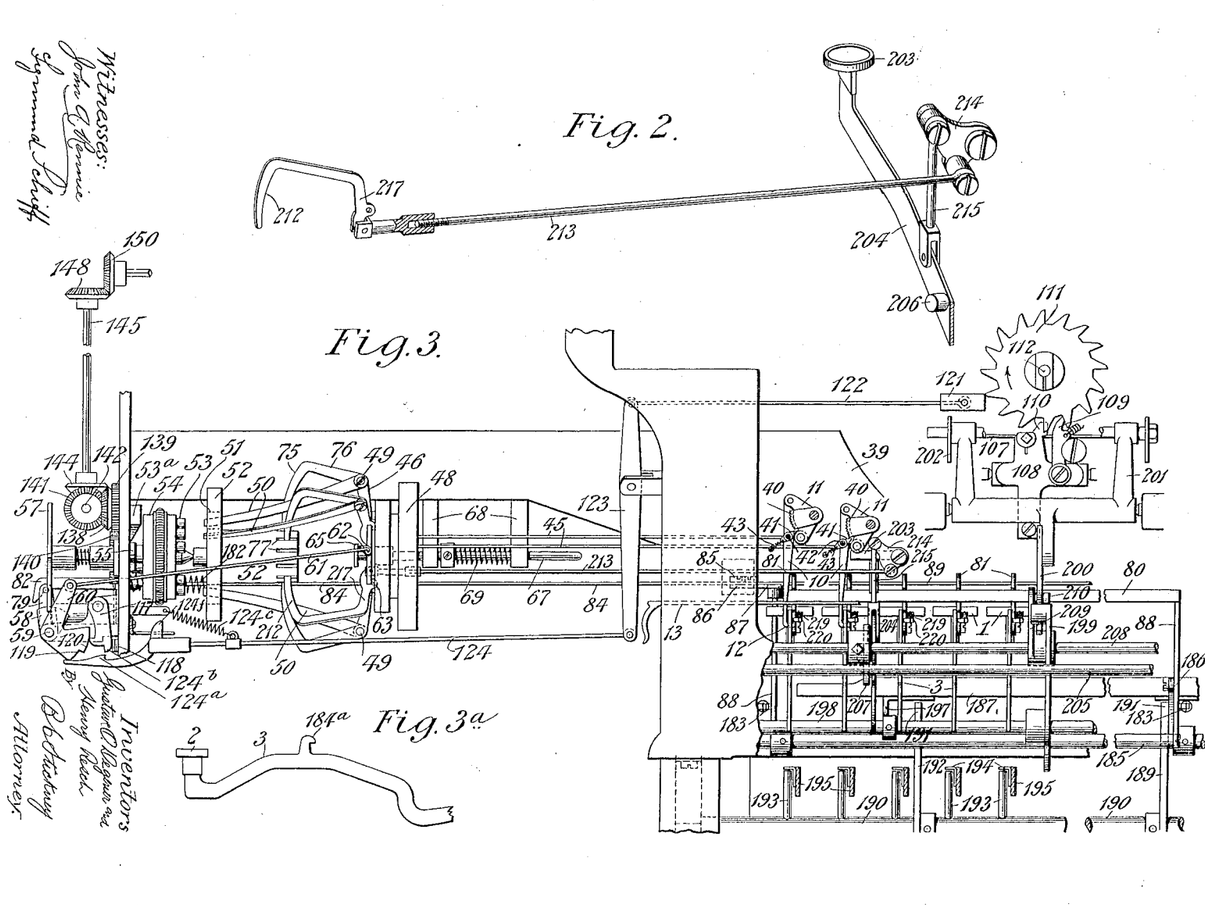

When any figure key 1 is depressed, its lever pulls down the hook 10 and rocks the bell crank 11, each of which carries a segment 40 of a ratchet, Fig. 3, each segment engageable by a double-acting pawl 41 pivoted at 42 upon a fixed plate 39. Each pawl is vibratable to either side of its normal position, and is there held by a draw spring 43. During the descent of the key, the pawl rides freely over the segment and prevents return of the key. As soon however as the depression of the key is completed, the pawl slips off from the upper end of the segment and the spring 43 returns the pawl to the normal condition, thus permitting the return of the key under the influence of the spring 38, Fig. 1. During such return stroke of the key the segment rides freely up past the pawl, the latter serving to prevent a repeated depression of the key before the return stroke of the latter is completed. Upon the key resuming its normal condition, the pawl 41 again swings clear of the segment and the spring 43 returns the pawl to normal position.

Figures 4, 9, 10:
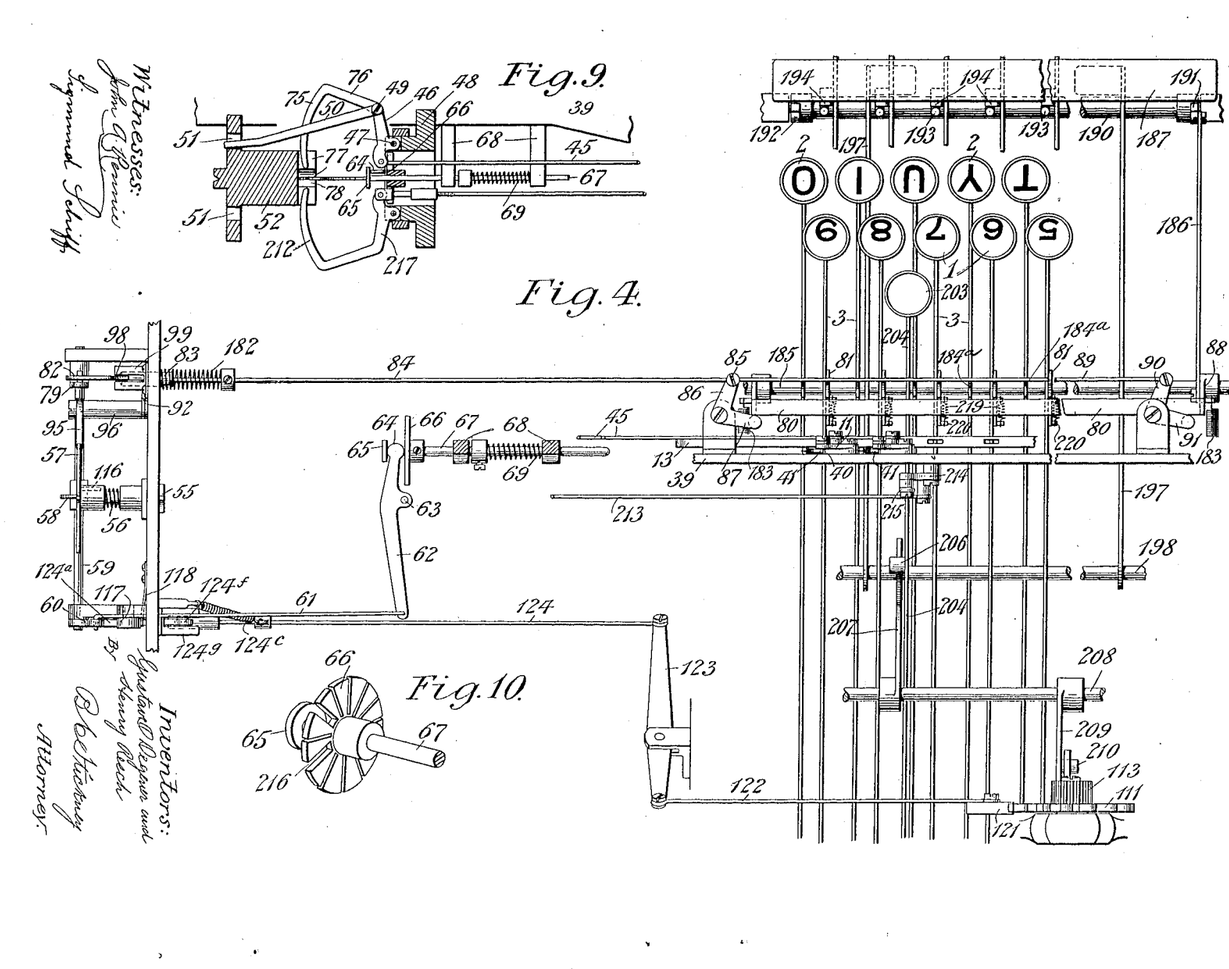
Fig. 4 is a sectional plan of the lower portion of the typewriting and computing devices.
Fig. 9 is a sectional rear elevation of certain connections between the keys and the escapement wheel of the computing mechanism.
Fig. 10 is a perspective view of a universal disk operable by the numeral keys and employed to control the escapement devices of the computing mechanism.

To each of the bell cranks 11 is pivoted a link 45, the other end of which is pivoted to a lever 46, Figs. 3, 9. These levers are disposed radially and fulcrumed at 47 upon an annular fixture 48. Each lever is pivoted at 49 to one end of a jack 50, the other end of the jack being loosely guided in perforations 51 in a fixed disk 52. Whenever a key is depressed and its bell crank 11 is turned, the associated lever 46 is actuated by link 45 and thrusts the jack 50 to the left, and causes it to project one of a series of movable escapement teeth or pins 53 carried upon an escapement wheel 54, said pins returnable by a cam 53$^a$, Fig. 5. When any jack is advanced, it pushes the adjacent pin or tooth through the wheel, so that the tooth protrudes from the opposite side thereof in position to engage and drive a rotary four-tooth pinion 55, Figs. 4, 8, which is fixed upon the same shaft 56 as the four-toothed secondary escapement wheel 57. The latter is arrested by a vibratory dog 58, Fig. 6, and thus the primary escapement wheel 54 is held in check. Whenever the dog 58 vibrates to release the secondary escapement wheel 57, the four-toothed pinion 55 is rotated by the projecting pin 53, and permits the escapement wheel 54 to rotate until the last projected pin thereon engages with said four-toothed pinion 55, and rotates the latter until the succeeding tooth of the secondary escapement wheel 57 engages the vibrating dog 58. The adding wheel which is at the time connected to the escapement wheel 54, is given a corresponding degree of rotation. When another pin 53 is protruded and the dog 58 is then vibrated, there is a further action of the wheel 54, dependent upon the distance of the last projected pin 53 from the pin which was projected therebefore. Accordingly, any amount of rotation can be given to an adding wheel by depressing the proper key 3 of the series. Said vibrating dog 58 is fixed upon a rock-shaft 59, Figs. 3, 4, 5, 8, the latter having an upstanding arm 60 for rocking said shaft; and said arm 60 is connected by a link 61 to one end of a lever 62, which is pivoted between its ends upon the framework, as at 63, and at its other end carries a head 64, which fits loosely between a small collar 65 and a large collar or disk 66, Fig. 10, both fixed upon an endwise movable guide rod 67, the latter working in hangers 68. Any of the levers 46 may engage the disk 66 to move it, and thus operate the lever 62 and the dog 58; and a spring 69 will return these parts to normal positions upon relief of the key from pressure. Thus it will be seen that a complete vibration of the dogs 58 and 116 upon the rock shaft 59 occurs at each depression and release of any figure-key 1, and hence that the primary escapement wheel 54 is permitted to advance a distance dependent upon the key depressed.

Each of the key-operated arms 46 may be provided with a key-interference member in the form of a blade 75, Fig. 9, which may be in the form of a segment having the pivot 47 as a center. These blades 75, which are carried upon arms 76, formed upon said levers, are loosely guided or supported in a series of diametrical slots 77 formed in one end of the fixture 52, and the points of the blades form a circle around a small central opening 78 in said support 52; and as long as said opening is occupied by a blade, no other blade can pass through said opening, as it will encounter the first blade; and hence it is impossible to operate any of the remaining figure keys until the first key has returned to or substantially to normal position. In other words, each key interferes with the operation of all the other keys, so that it is not practicable to depress more than one key at a time. It will also be seen that as soon as one key is partly depressed, it prevents the depression of any other key.

Fixed to the shaft 59, which rocks each time that any figure key is depressed, is an arm 79, which is operatively connected to a bar 80, Figs. 3, 4, to swing the latter forwardly beneath hooks 81, provided upon the key-levers. The connection includes a hook 82 fixed at one end to a head 83 provided upon one end of a rod 84, the latter being pivoted at 85 to an arm 86 of a bell-crank, and the bell crank having an arm 87 to engage said bar 80 or the rocking standards 88 carrying the same. Said arm 86 may be connected by a link 89 to an arm 90 of another bell crank, the latter having an arm 91 to engage the bar 80, to help swing it forwardly. When a key is depressed, the shaft 59 rocks and pulls the link 82, and, through the rod 84 and the bell cranks rocks the locking bar 80 forwardly beneath the key-lever hooks, so that no other key can be depressed. At the same time, a latch 92 (Figs. 6, 8) is snapped by a spring 93 up into a notch 94 formed in the head 83, whereby the locking bar 80 is mechanically maintained in effective position, so that the keys cannot be unlocked until said latch 92 is released, even should the operated key rise again in the meantime. The latch 92 is releasable by means of an arm 95 fixed to a rock-shaft 96 upon which the latch is mounted; and the release may be effected by any of the teeth of the secondary escapement wheel 57 striking up the arm 95, and causing the latch 92 to drop from the notch 94. The parts are so constructed that this release takes place only when the primary escapement wheel 54 has come to rest or nearly so. Hence the keys remain locked until the primary escapement wheel has about completed its operation, so that it is impossible to operate any of the jacks 50 prematurely, and thereby cause the spurious projection of one or more of the escapement pins or teeth 53; so that liability is avoided of the escapement wheel acting erroneously at the succeeding operation.

The escapement wheel 57, which controls the dog 58, is not fully released until the return stroke of the universal bar 66, that is, until the key starts upon its upward stroke; and the operation of the primary escapement wheel 54 takes place thereafter and before the next key is depressed. All the keys operate the carriage-escapement mechanism, (that is, the dogs which control the step-by-step letter-feeding movements of the paper carriage). To prevent premature re-operation of said dogs, and insure that the paper carriage shall remain stationary during the operation of the primary escapement-wheel 54, all of the keys are locked by the bar 80; and the master wheel (which is controlled by the escapement wheel 54 and engages the adding wheels in succession at the step-by-step movements of the paper carriage) is maintained in engagement with the desired adding wheel during the operation of the primary escapement wheel 54.

The arm 79 and rock shaft 59 may return to or toward normal position, in advance of the return of the hook 82 and its connections to normal positions, for the purpose of feeding the paper carriage. The hook 82 terminates in a beveled dwell portion 97, Fig. 7, which is about concentric to the shaft 59, to permit further vibration of the shaft and the arm 79 after the rod 84 has been fully operated. The head 83 may be provided with a guide 98 to enter a fixed fork 99 to prevent rotation of the head.

The paper carriage 6 of the Underwood typewriter is fed step by step in the following manner. Upon each type bar 7 is a heel 106, Fig. 1, which engages and presses backwardly a universal bar frame 107, and the latter in turn actuates a dog rocker 108 having fast and loose dogs 109, 110 for alternate engagement with an escapement wheel 111, Fig. 3, the latter mounted upon a shaft 112, upon which is also mounted a pinion 113, Fig. 1, to mesh with a rack 114 mounted upon the paper carriage. When a figure key is depressed, the arm 60 is swung over, and the active tooth of the secondary escapement wheel 57 slips off the dog 58 and engages a dog 116, which is rigid with the dog 58; said dog 116 serving for temporarily detaining this escapement wheel 57 until the return to or nearly to normal position of the arm 60, whereupon the wheel 57 escapes from the detent 116, and the movement of the primary escapement-wheel 54 is permitted. It will be seen that the heel 106 on the type bars releases the universal bar 107 during the initial part of the return stroke of the type bar. Hence near the beginning of the return stroke of the arm 60, the paper carriage 6 is released for its letter-feeding movement.

Figures 5, 6, 7, 8:
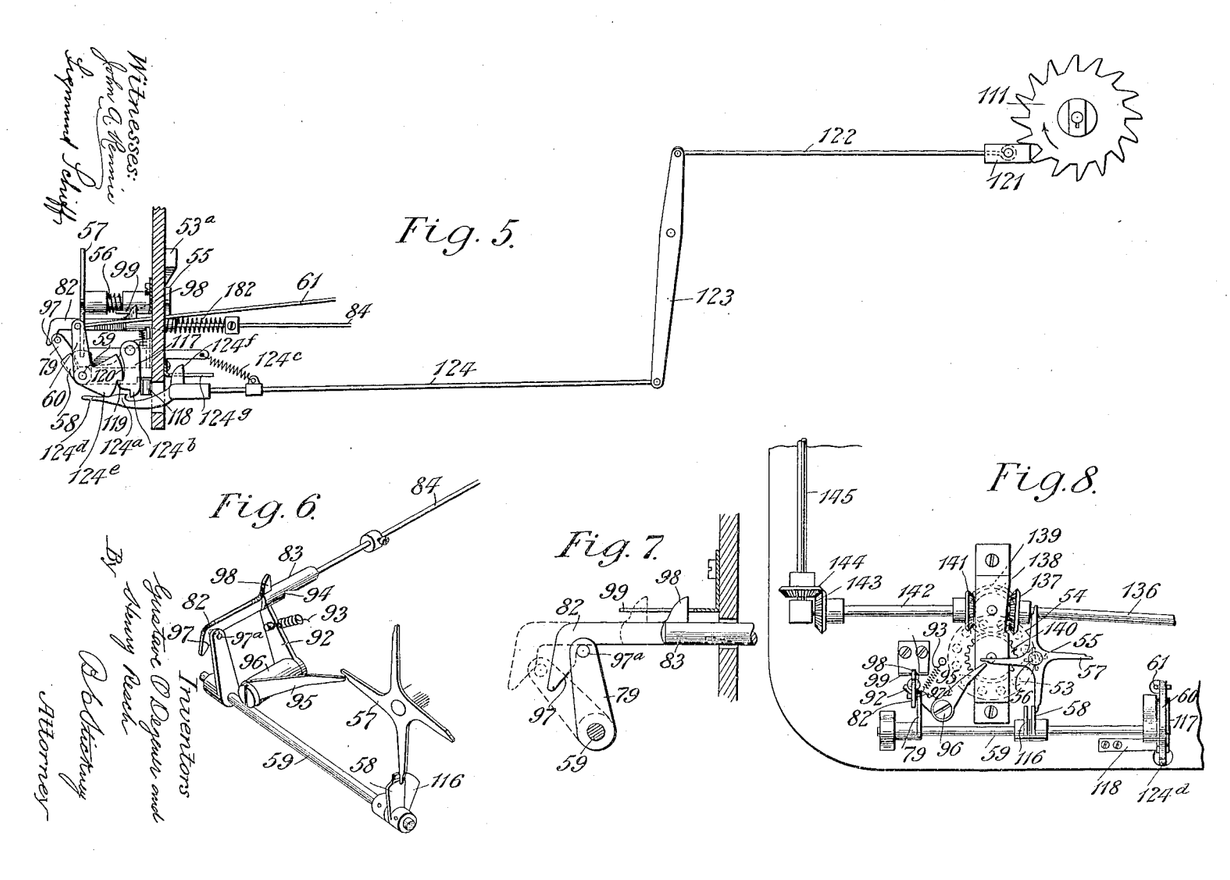
Fig. 5 is a sectional rear elevation, showing the position of the locking devices of the computing mechanism at the depression of a numeral key; the computing mechanism being locked against actuation.
Fig. 6 is a perspective view of a portion of the latch mechanism, which holds the key-locking devices in effective positions; the parts being shown in normal positions.
Fig. 7 shows a detail of certain devices seen at Fig. 6.
Fig. 8 is a side elevation of the secondary escapement wheel of the computing mechanism, and certain devices associated therewith.

A latch 117 Fig. 5 is pressed by a spring 118 into position to engage a catch 119 formed on the arm 60 when said arm has returned partly to normal position. Normally the latch is held back by a curved edge 120 formed on the arm 60; but upon the initial stroke of said arm 60, the spring 118 snaps the latch into position, (without preventing the completion of the initial stroke of the arm 60) and at the same time a spring 124ᶜ snaps a pallet 121 into one of the notches between the teeth of the escapement wheel 111; said latch being connected to said pallet by means of a rod 122, a lever 123, and a link 124. This pallet is designed to be engaged and to be returned to normal position by the succeeding tooth of the escapement wheel 111, which is turning in the direction of the arrow, during the letter-feeding movement of the carriage; whereby the latch 117 is withdrawn; but if the carriage action should be sluggish, the latch 117 remains effective, and the arm 60 is detained for an instant in the position at Fig. 5, at which time the escapement-wheel 57 still remains engaged by the detent dog 116, so that the primary escapement wheel 54 cannot turn. As soon, however, as the carriage escapement wheel 111 throws out the pallet 121, the return movement of the arm 60 toward normal position will be resumed, and the dog 116 will permit the escapement of the secondary wheel 57, and the latter may be freely driven by the projected escapement tooth 53 on the primary escapement wheel 54. This movement of the primary escapement wheel 54 takes place when the paper-carriage is at rest or approximately in its arrested position.

It will be seen that the link 124 carries at its free end a hook 124$^a$ Fig. 5 to engage a beak 124$^b$ formed on the latch 117 to pull the latter to the right at Fig. 5 and release the arm 60, whenever the link 124 is carried to the right at Fig. 5 by the action of the escapement wheel 111 on the pallet 121. A spring 124$^c$ returns the hook 124$^a$ to normal position at Fig. 3 together with the pallet 121; a horn 124$^d$ on said hook being held down by a projection 124$^e$ (Fig. 3) on the arm 60, to prevent the hook from interfering with the initial movement of the latch 117. The hook may have a guide 124$^f$ to work in a fixed fork 124$^g$ to prevent rotation or twisting thereof.

The number wheels are seen at 125, Fig. 1, mounted in a carriage 126, connected by lugs 127 to the typewriter carriage 6. The wheels are turned by a horizontal shaft 128. A power shaft 136, under constant torque, carries a bevel pinion 137, Fig. 8. The latter meshes with a bevel pinion 138, and to this is fixed a pinion 139 meshing with a pinion 140, which is fixed to the primary escapement wheel 54, whereby the train of gears, just described, is held stationary, until the escapement wheel is permitted to turn in the manner already described. The connection to the adding wheels includes a pinion 141 meshing with 138 and carried on the same shaft 142 with a pinion 143; and the latter meshes with a pinion 144 on a vertical shaft 145. The latter has a pinion 148 meshing with pinion 150 on shaft 128.

The shaft 128 extends through a tube 151 and carries at its end a master wheel 152, the teeth of which project from the tube and engage internal teeth 153, which may ride upon said tube 151 and upon another tube or shaft 152$^a$ in line therewith. Said teeth 153 are formed upon gears 154, which are also housed in the carriage 126 and mesh with gears 155 provided upon the adding wheels 125, as set forth in a pending application No. 543,603 of Walter Wright. Tens may be carried from each adding wheel to the next by any suitable mechanism, as for instance by the means disclosed in said Wright application.

In operation, the keys are depressed successively to write the desired numbers. The heel 106 upon the type bar pushes back the universal bar 107, and the latter moves the dog 110 out of engagement with the carriage escapement wheel 111, and the dog 109 into engagement with said wheel; the dog 110 making its usual stepping movement to position to engage the succeeding notch in the escapement wheel 111. During said downward movement of the key, the link 10 is pulled down, the bell crank 11 is rocked, and the link 45 pulled. This rocks the lever 46, throwing the blade 75 into position to intercept any of the remaining blades. At the same time the jack 50 thrusts one of the escapement pins 53 toward the left, so that the latter is projected into the path of the four-toothed pinion 55. At the same time the lever 46 presses the universal disk 66 toward the right, at Fig. 3, thereby vibrating the lever 62, and through the link 61 rocking the arm 60 to position at Fig. 5. By this movement the shaft 59 is rocked, and the secondary escapement wheel 57 of the adding mechanism escapes the dog 58 and engages the dog 116. At the same time the arm 79 upon said rock shaft 59 moves the head 83 and link 84 (having a returning spring 182) to turn the bell cranks 86, 87, 90 and 91 (Fig. 4) to swing the locking bar 80 forwardly beneath the hooks 81 on all the key levers, whereby operation of the carriage feeding devices by any of said key-levers is prevented. The latch 92 is snapped by the spring 93 into the notch 94 in said head 83, to hold the key-locking bar 80 in its effective position. Upon the release of the key from pressure, the key and type bar are returned to normal positions by the spring 38; and the universal bar and feed dogs 109, 110 are returned to normal positions by the usual spring (shown diagrammatically at 180, Fig. 1, as a compression spring.)

As usual in the Underwood machine, the universal bar 107 remains motionless during the major portion of the printing stroke of the type bar, and is returned to normal position during the initial portion of the return stroke of said type bar to normal position. Hence the carriage 6 is released while the type is only a short distance from the platen 5. During this initial portion of the return stroke of the key, the head 83 and the locking bar 80 remain in their effective positions; but the arm 60 and the rock shaft 59 are rocked toward normal positions by spring 69, a pin 97$^a$ on the arm 79 moving freely along the hook 82. During this return movement, the tooth of the secondary escapement wheel 57 bears against the backwardly moving dog 116, but does not quite escape therefrom, owing to the engagement of the catch 119 (in the bell crank 60) by the arresting hook or latch 117, as at Fig. 8; this pawl 117 being held in engagement with the catch 119 by the spring 118, the spring 124° causing the pallet 121 to project toward the succeeding tooth of the carriage escapement wheel during the latter part of the initial stroke of the bell crank 60, as at Fig. 5; and the latch 117 being intended to intercept said bell crank 60 in the return movement of the latter. The spring 124° it will be understood acts upon the link 122 to move the pawl 117 to the position at Fig. 3, and at the same time vibrates the lever 123 and acts upon the link 124 to move the pallet 121 from the idle normal position at Fig. 3 to the position at Fig. 5. Hence the secondary escapement wheel 57 of the adding mechanism is temporarily detained until said succeeding tooth of the carriage escapement wheel 111 engages said pallet 121, as at Fig. 5, and pushes the same to the position at Fig. 3. This withdraws the pawl 117 from the notch 119, and permits the springs 182 and 69 to return the bell crank 60 and the rock shaft 59 to normal position, the secondary escapement wheel 57 being thereby released, so that the projecting escapement pin on the primary escapement wheel 54 is enabled to rotate the dog pinion 55 and escape past the same. The escapement wheel 54 now rotates until the escapement tooth 53 thereon, which was projected by the last depressed key, comes into engagement with the succeeding dog of the pinion 55, and causes the succeeding tooth on the secondary escapement wheel 57 to strike the dog 58, whereby the escapement wheel is arrested. During this movement of the secondary escapement wheel 57, the tooth thereof which was last in engagement with the dog 116 swings up the arm 95 and withdraws the latch 92 from the notch 94, thereby permitting a spring 183, Fig. 1, to withdraw the locking bar 80 from the key hooks 81, thus releasing the keys. It will also be understood that during the return key stroke, the blade 75 is withdrawn from the paths of other blades, so that another key may be operated.

The original projected escapement pin 53 is returned to normal position by a stationary cam 53ª (Figs. 3 and 5) during the movement of the escapement wheel. The described movement of the primary escapement wheel 54 was effected by the train of gearing 136, 137, 138, 139 and 140; and a corresponding movement was imparted through the gearing 141, 143 and 144 and through the pinion 150, shaft 128 and master wheel 152, thereby rotating the adjacent pinion 154, and the gear 155 of the adding wheel 125. This movement of the master wheel occurs after the paper carriage 6 has come to rest, that is, after it has completed its letter-feeding movement.

The lever 3 of each alphabet key 2 is formed with a hook 184ª, (Figs. 3ª and 4), whereby these keys are locked by the bar 80 simultaneously with the numeral keys; and are simultaneously released by said bar 80, which also performs the usual function in the Underwood machine of locking all the type keys at the end of each line of writing.

The described key-locking frame 80, 88 is fixed upon a rock shaft 185, Figs. 1 and 4, and is connected by a forwardly extending link 186 to devices for locking the usual space-key 187, and the usual tabulating key 188. Said link 186 is connected at its forward end to an arm 189, rising from a rock shaft 190, and having at its upper end a stop 191, which is swung forward simultaneously with the locking bar 80, and thereafter intercepts the space-key 187, so that it cannot be operated. Upon the rock-shaft 190 is also provided a companion stop 192 for the space key. Also rising from said rock shaft 190 are stop pins 193, which move forward (simultaneously with the stops 191, 192 and 80) to positions under ears 194 on the tabulator levers 195; the latter carrying the usual tabulator stops 196 at their rear ends. Hence all of the numeral, alphabetical, space and tabulating keys are simultaneously locked; and at the proper time these locking devices are returned to normal positions by the spring 183. Said space key 187, as usual, is carried upon arms 197 extending forwardly from a rock shaft 198, and the latter carries an arm 199 to engage a pendent arm 200 and rock the latter. This arm 200 hangs from a rocking frame 201, which carries at its upper end a pair of arms 202, forming supports for the universal bar frame 107, as usual on said Underwood machine. Depression of the space-key, therefore, rocks the frame 201, and operates the universal-bar frame 107, and actuates the dog rocker 108, so that the dogs 109, 110 let off the escapement wheel 111 for a single step, and the carriage is hence advanced a letter-space, under the operation of the usual driving spring, not shown.

From the foregoing, it will be understood that when any numeral key is depressed, it causes the corresponding escapement pin 53 to project from the escapement wheel 54, and also, by means of the bar 80 and its connections, locks against actuation all of the remaining numeral keys as well as the alphabet keys, the space key and the tabulating keys; the locking devices being held mechanically in effective positions by means of the latch 92, the latter engaging the notch 94 in the head 83 connected to said bar 80. This latch 92 is released only when the escapement wheel 54 completes its rotation, the release being effected by the engagement of the secondary escapement wheel 57 with the arm 95 of the latch. The secondary escapement 57 cannot operate unless the carriage escapement wheel 111 throws out the pallet 121 and thereby unlocks the dog rocker 59 for a return movement of the latter, thereby freeing the secondary escapement wheel 57. It will be seen, therefore, that if it should happen that the numeral key should not be depressed quite far enough to effect the necessary operation of the carriage-feeding dogs 109, 110, and should return to normal position without feeding the carriage, all of the keys would remain locked. It will be understood that such a condition may occur, because the heel 106 of the type bar acts upon the universal bar 107 only during the last part of the printing stroke of the key 1, and the dogs 109, 110 are usually set to escape in one direction from the wheel 111 at the extreme end of the downward movement of the key, and to escape in the other direction from said wheel at the initial portion of the return stroke of the key. If the key is not depressed smartly enough to secure this usual escapement movement of the dogs 109, 110, the carriage is not fed, and consequently the keys all remain locked, and the escapement pin 53 operated by said key remains protected.

It will be understood that the check pawls 41 and ratchets 40 are so formed that it is not necessary to depress the key 1 to its fullest extent in order to release such key for its return stroke, as, if such were the case, it might happen that the key would become accidentally locked in its depressed position. Therefore it is possible for the key to be depressed sufficiently to release it from the pawl 41, but not sufficiently to operate fully the carriage feeding dogs 109, 110.

One of the main features of the present invention resides in means to release all of the type-operating and other keys when the conditions above noted have occurred, that is, when a numeral key has been depressed and returned to normal position without feeding the carriage, thus locking all the keys.

We provide a release key 203, Figs. 1, 2, carried on the forward end of a lever 204, fulcrumed on the same bar 205 as the other key levers, and having a similar returning spring 38; and upon this lever 204 we provide a projection 206 to bear down a rock arm 207, which is fixed upon a rock shaft 208, the latter carrying an arm 209, which has a pin 210 to engage a slot 211 in the arm 200. The lever 204, it will be seen, does not interfere with the usual operation of the arm 200, nor with the simultaneous movement of the parts 209, 207; but at any time the key 203 may be depressed to swing the arm 207, and thereby the above described connections operate the universal bar fully and cause the dogs 109, 110 to permit the carriage-feeding wheel 111 to escape one tooth, thereby permitting the carriage to feed, and simultaneously operating the pallet 121 and causing the hook 124ª to release the latch 117, so that the spring 69 may return the rock shaft 59 to normal position, thus permitting the secondary escapement wheel 57 to escape from the dog 116, and to swing up the arm 95 to release the latch 92, so that the spring 182 may return the rod 84 and the locking bar 80 with its connections to normal ineffective positions, thereby releasing all of the type-operating, space and tabulating keys.

The release key 203 may, if desired, be provided with a locking blade 212, Figs. 2, 9, to prevent the accidental operation of the key 203 during the operation of one of the numeral keys; said blade 212 being inserted in one of the slots 77, to be locked by any of the blades 75. The blade 212 is mounted similarly to the blade 205, and is connected by a link 213 to a bell crank 214, the latter being connected by a vertical link 215 to the key lever 204, Fig. 2. The key 203 does not operate the disk 66, the latter having a cut-away at 216, in which the lever 217 (carrying the blade 212) may play freely.

An additional feature of the present invention consists in pivoting the key-locking hooks 81, so that when the locking bar 80 has been moved to effective position by depressing any numeral key, said depressed key may return to normal position and hook over said locking bar 80, so as to become locked thereby until the operation of the release key 203. Each hook 81 is pivoted to its lever at 218, and is held by a returning spring 219 (Figs. 1, 3, 4) against a stop pin 220 on the lever.

Variations may be resorted to within the scope of the invention, and portions of the improvements may be used without others.

In the application of Gustave O. Degener 640,752, filed July 27, 1911, is claimed means connected to the herein-described interlocking blades to set the index pins; said Degener being the inventor of said feature.

Having thus described our invention, we claim:

1. In a combined typewriting and computing machine, the combination of a carriage, type-operating keys, including alphabet and numeral keys, a space key, an escapement mechanism controllable by all of said keys, computing mechanism controlled by said numeral keys, means settable by any of said numeral keys for locking against actuation the type-operating keys and the space key, and an auxiliary key having means operating through the escapement mechanism for effecting release of all of said keys.

2. In a combined typewriting and computing machine, the combination of a carriage, type-operating keys, including alphabet and numeral keys, a space key, an escapement mechanism controllable by all of said keys, computing mechanism controlled by said numeral keys, means settable by any of said numeral keys for locking against actuation the type-operating keys and the space-key, automatically operating means for releasing said keys, and an auxiliary key having means operating through the escapement mechanism for effecting release of all of said keys.

3. In a combined typewriting and computing machine, the combination of a set of type-operating keys, including alphabet and numeral keys, a power-driven computing mechanism controlled by the numeral keys and including an escapement wheel having escapement pins settable by the numeral keys, means settable by any numeral key for locking the type-operating keys against actuation, said key-locking means being releasable through the movement of said escapement wheel, means also settable by said numeral keys for locking said escapement wheel against actuation, and an auxiliary key having means for effecting the release of said escapement wheel.

4. In a combined typewriting and computing machine, the combination of a set of type-operating keys, including alphabet and numeral keys, a letter-spacing key, a power-driven computing mechanism controlled by the numeral keys and including an escapement wheel having escapement pins settable by the numeral keys, means settable by any numeral key for locking said type-operating keys and said letter spacing-key against actuation, said key-locking means being releasable through the movement of said escapement wheel, means also settable by said numeral keys for locking said escapement wheel against actuation, automatically operating means for unlocking said escapement wheel, and an auxiliary key having means for effecting the release of said escapement wheel.

5. In a combined typewriting and computing machine, the combination of a typewriter carriage, carriage-feeding means, type-operating keys including alphabet and numeral keys, a space key, a computing mechanism operable by the numeral keys, carriage-feeding means, operable by all of said keys, means settable by any of said numeral keys for locking against actuation the type-operating keys and the space key, means dependent upon the actuation of said carriage-feeding means for releasing said keys from said locking means, and an auxiliary key having means for operating said carriage-feeding devices.

6. In a combined typewriting and computing machine, the combination of a typewriter carriage, carriage-feeding means, type-operating keys including alphabet and numeral keys, a space key, a computing mechanism operable by the numeral keys, carriage-feeding means operable by all of said keys, means settable by any of said numeral keys for locking against actuation the type-operating keys and the space key, means dependent upon the actuation of said carriage-feeding means for releasing said keys from said locking means, an auxiliary key having means for operating said carriage-feeding devices, and means for preventing the operation of said auxiliary key simultaneously with any numeral key.

7. The combination of a carriage, a feeding device therefor, a set of type-operating numeral keys, means operable by the numeral keys for controlling said carriage-feeding device, a computing mechanism controlled by the numeral keys, means settable by said numeral keys and releasable through the movement of said carriage for locking said computing mechanism against movement, means settable by any numeral key for locking the numeral keys against actuation; said key-locking means being releasable through the movement of said computing mechanism, and an auxiliary key for operating said carriage-feeding mechanism, to release said computing mechanism.

8. In a combined typewriting and computing machine, the combination of a typewriter carriage, a feeding device therefor, a set of type-operating keys including alphabet and numeral keys, means operable by the numeral keys for controlling said carriage-feeding device, a power-driven computing mechanism controlled by the numeral keys and including an escapement-wheel having escapement pins settable by the numeral keys, means settable by said numeral keys and releasable through the movement of said carriage for locking said escapement-wheel against movement, means settable by any numeral key for locking the numeral and alphabet keys against actuation; said key-locking means being releasable through the movement of said escapement-wheel; and an auxiliary key for operating said carriage-feeding mechanism, to release said escapement-wheel in case of failure of said feeding device to feed the carriage.

9. In a combined typewriting and computing machine, the combination of a typewriter carriage, a set of type-operating keys including alphabet and numeral keys, a space key, means operable by all of said keys for feeding said carriage, a power-driven computing mechanism controlled by the numeral keys and including an escapement-wheel having escapement pins settable by the numeral keys, means settable by said numeral keys and releasable through the movement of said carriage for locking said escapement-wheel against movement, means settable by any numeral key for locking the numeral, alphabet and space keys against actuation; said key-locking means being releasable through the movement of said escapement-wheel; and an auxiliary key for operating said carriage-feeding mechanism, to enable the carriage to feed and said escapement wheel to be released.

10. In a combined typewriting and computing machine, the combination with a set of type-operating keys including alphabet and numeral keys, and a computing mechanism having a delayed action operable by said numeral keys, of hooks pivoted on said keys, a rock bar to catch said hooks to enable any of said numeral keys to lock the remaining keys against actuation, each of said numeral keys being returnable to normal position independently of said bar, by reason of the pivoting of said hooks.

11. In a combined typewriting and computing machine, the combination with a set of type-operating keys, including alphabet and numeral keys, and a computing mechanism operable by said numeral keys, of hooks upon the alphabet keys, a locking bar, means to enable any of the numeral keys to cause the locking bar to move into position to intercept said hooks to prevent operation of the alphabet keys, and hooks pivoted upon the numeral keys to coöperate with said locking bar and to permit any depressed numeral key to rise independently of the locking bar.

12. In a combined typewriting and computing machine, the combination with a set of type-operating keys, including alphabet and numeral keys, and a computing mechanism operable by said numeral keys, of hooks upon the alphabet keys, a locking bar, means to enable any of the numeral keys to cause the locking bar to move into position to intercept said hooks to prevent operation of the alphabet keys, and hooks pivoted upon the numeral keys to coöperate with said locking bar and to permit any depressed numeral key to rise independently of the locking bar, springs for said pivoted hooks, and stops to limit the movements of the hooks affected by the springs.

13. In a combined typewriting and computing machine, the combination with numeral keys and computing wheels, of a traveling carriage, a master-wheel moved by said carriage to engage said computing wheels *seriatim* to turn them to an extent determined by said numeral keys, a tabulating key for positioning said carriage, a space key for feeding said carriage letter-spaces, a ledge on said tabulating key, a cross bar on said space key, a hook on each numeral key, and rock arms for locking one key by its ledge, another by its cross bar, and another by its hook.

14. In a combined typewriting and computing machine, the combination with numeral keys and computing wheels, of a traveling carriage, a master-wheel moved by said carriage to engage said computing wheels *seriatim* to turn them to an extent determined by said numeral keys, a tabulating key for positioning said carriage, a space key for feeding said carriage letter-spaces, a hook on each numeral key, a rocking bar arranged to be swung under said hooks to lock said numeral keys, and a link arranged to swing rock arms under said tabulating and space keys to lock them.

15. In a combined typewriting and computing machine, the combination with a space key and tabulating keys at the front of the machine, of a computing mechanism escapement, numeral keys for operating said escapement, and a single rock shaft carrying arms arranged to be swung under both tabulating and space keys to lock them while said escapement is moving.

16. In a combined typewriting and computing machine, the combination with numeral keys having hooks, of a bar arranged to be swung under said hooks to lock said keys against operation, a computing escapement arranged to hold said bar in locking position during the movement of said escapement, and pivots on which said hooks turn whereby a key may return to position where it is locked while said bar is still in locking position.

17. In a combined typewriting and computing machine, the combination with a computing mechanism escapement, of numeral keys locked during the operation of said escapement, a typewriter carriage, an escapement for said carriage fed by said keys, means for delaying the action of said computing escapement till said carriage has completed its feeding movement, a key for releasing said keys, and means for locking said release key during the depression of a numeral key.

18. In a combined typewriting and computing machine, the combination with a computing mechanism escapement, of numeral keys locked during the operation of said escapement, a key for releasing said keys, and a bar for locking said release key during the depression of a numeral key.

19. In a combined typewriting and computing machine, the combination with computing wheels and numeral keys, of a typewriter carriage, an escapement for said typewriter controlled by said keys, an escapement for said computing wheels, a secondary escapement for controlling said computing escapement, a latch holding said secondary escapement after its initial movement by said key, and a hook operated from said typewriter to release said latch; said hook comprising a cam to guide it clear of said latch on one stroke.

20. In a combined typewriting and computing machine, the combination with alphabet keys having fixed locking members thereon, of numeral keys having swinging locking members thereon, and a locking bar past which said pivoted locking members may rise but not the fixed locking members.

21. In a combined typewriting and computing machine, the combination with numeral keys and computing wheels, of a hook for each numeral key, a bar for swinging said hooks to disconnect them from the numeral keys, a connection from each hook to the computing mechanism, an unlocking key, and a permanent connection from said unlocking key to the computing mechanism.

22. In a combined typewriting and computing machine, the combination with an escapement wheel constantly tending to turn, of an escapement device for said wheel, a typewriter carriage, numeral keys for feeding said carriage and operating said escapement, a secondary escapement by which said keys control said first escapement, means for starting the operation of said secondary escapement by the initial depression of a numeral key, means for arresting said secondary escapement till the feeding of said carriage is completed, a lock holding all numeral keys against depression but not return in said interval of arrest, and a release key for unlocking said secondary escapement if said carriage fails to feed.

G. O. DEGENER.
HENRY RESCH.

Witnesses:
WILLIAM E. KEYES,
B. C. STICKNEY.

---

Copies of this patent may be obtained for five cents each, by addressing the "Commissioner of Patents, Washington, D. C."